United States Patent

Nishimura et al.

[11] Patent Number: 5,999,756
[45] Date of Patent: Dec. 7, 1999

[54] VIEWFINDER DEVICE OF DISPLAY PLURAL VISUAL FRAMES

[75] Inventors: Tomoki Nishimura, Kawasaki; Kiyosada Machida, Urawa; Akio Nishizawa, Kawasaki, all of Japan

[73] Assignee: Nikon Corporation, Tokyo, Japan

[21] Appl. No.: 08/992,087

[22] Filed: Dec. 17, 1997

[30] Foreign Application Priority Data

Dec. 17, 1996 [JP] Japan .................................... 8-337249

[51] Int. Cl.⁶ .................................................. G03B 13/12
[52] U.S. Cl. ........................................... 396/296; 396/380
[58] Field of Search ................................... 396/296, 378, 396/380

[56] References Cited

U.S. PATENT DOCUMENTS 4,973,997 11/1990 Harvey ................................ 396/378 X Primary Examiner—W. B. Perkey

[57] ABSTRACT

A viewfinder device having an optical path for viewing a photographic image includes a plurality of visual field frames. Each of the plurality of visual field frames define a photographic range. In addition, each of the plurality of visual field frames is positioned on one of a plurality of visual field frame display units. The plurality of visual field frame display units have overlapping regions and are positioned on a viewfinder mask member. The viewfinder mask member is movable in the optical path. The overlapping portions of the visual field frame display units reduce an amount of movement necessary to move the viewfinder mask member to position the visual field frames within the optical path.

19 Claims, 3 Drawing Sheets

VIEWFINDER DEVICE OF DISPLAY PLURAL VISUAL FRAMES

CROSS-REFERENCE TO RELATED APPLICATIONS

This application is based upon and claims priority of Japanese Patent Application No. 08-337249, filed Dec. 17, 1996, the contents being incorporated herein by reference.

BACKGROUND OF THE INVENTION

The present invention relates to a viewfinder device suitable for and positionable in a camera. More particularly, the present invention relates to a viewfinder device to display plural visual field frames by selectively inserting a visual field frame display unit into an optical path of the viewfinder device.

FIG. 6 (PRIOR ART) illustrates a mask member of a prior art viewfinder device of a camera. Three visual field frame display units or portions 52A–52C are positioned in a viewfinder mask member 52. Photographic ranges are defined by three visual field frames 52a–52c positioned in visual field frame display portions 52A–52C. As illustrated in FIG. 6, visual field frame mask member 52 is movable in a left direction M1 and a right direction M2. Movement of mask member 52 in directions M1 and M2 is perpendicular to a viewfinder optical axis (not shown), that extends from mask member 52 to a photographic subject (not shown). By moving mask member 52, visual field frame display portions 52A–52C are positioned in predetermined display positions. As a result, visual field frame display portions 52A–52C are selectively inserted into an optical path of the viewfinder. One of the visual field frames 52a–52c of visual field frame display portions 52A–52C which has been positioned in the display position is then displayed in the viewfinder. A photographic range defined by the displayed visual field frame, 52a, 52b, or 52c, is displayed in a viewfinder image plane, and is presented in a final photographic print.

As illustrated in FIG. 6 (PRIOR ART), visual field frame display portions 52A–52C of the prior art viewfinder are adjacently positioned relative to each other and do not overlap. An amount of space occupied by field frame display portions 52A–52C is necessarily equal to or greater than a sum total of horizontal widths of visual field frame display portions 52A–52C. The size of viewfinder mask member 52 is influenced by the total of the widths of visual field frame display portions 52A–52C. Since the viewfinder mask member 52 has to provide the space required by visual field frame display portions 52A–52C, the viewfinder device is required to be relatively large.

BRIEF SUMMARY OF THE INVENTION

It is therefore an object of the present invention to provide a viewfinder device that is smaller in size.

It is a further object of the present invention to provide a viewfinder device that reduces an amount of space required by a plurality of visual field frame display units.

It is yet another object of the present invention to provide a viewfinder device in which a distance required to move an actuating member when choosing between visual field frame display units is the same.

It is a still further object of the present invention to provide a viewfinder that minimizes operator confusion when choosing between visual field frame display units.

Objects of the invention are achieved by a viewfinder device for viewing a photographic image along an optical path that includes a first visual field frame display unit and a second visual field frame display unit. A moveable viewfinder mask member moves the first and second visual field frame display units within the optical path. A first and a second visual field frame are positioned within respective first and second visual field frame display units. First and second visual field frames define a photographic range for a photographic process as the first and second visual field frame display units move within the optical path. First and second visual field frame display units overlap to minimize the size of the moveable viewfinder mask member necessary to position the visual field frame display units.

Further objects of the invention are achieved by a viewfinder device for viewing a photographic image along an optical path that includes a first visual field frame display unit and a second visual field frame display unit. First and second visual field frame display units overlap in an overlapping region. A moveable display member positions first and second visual field frame display units within the optical path.

A first visual field frame and a second visual field frame are positioned within respective first and second visual field frame display units and define corresponding photographic ranges. An end portion having a length, corresponds to both first and second visual field frames and is positioned within the overlapping region.

Still further objects of the invention are achieved by a viewfinder device having an optical path for viewing a photographic image that includes a first visual field frame display unit, a second visual field frame display unit, and a third visual field frame display unit. A moveable display member moves the first, second, and third visual field frame display units within the optical path. A first visual field frame, a second visual field frame, and a third visual field frame positioned within respective first, second, and third visual field frame display units define corresponding photographic ranges. First and second visual field frames overlap at a first overlapping region. Likewise, second and third visual field frame display units overlap at a second overlapping region.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
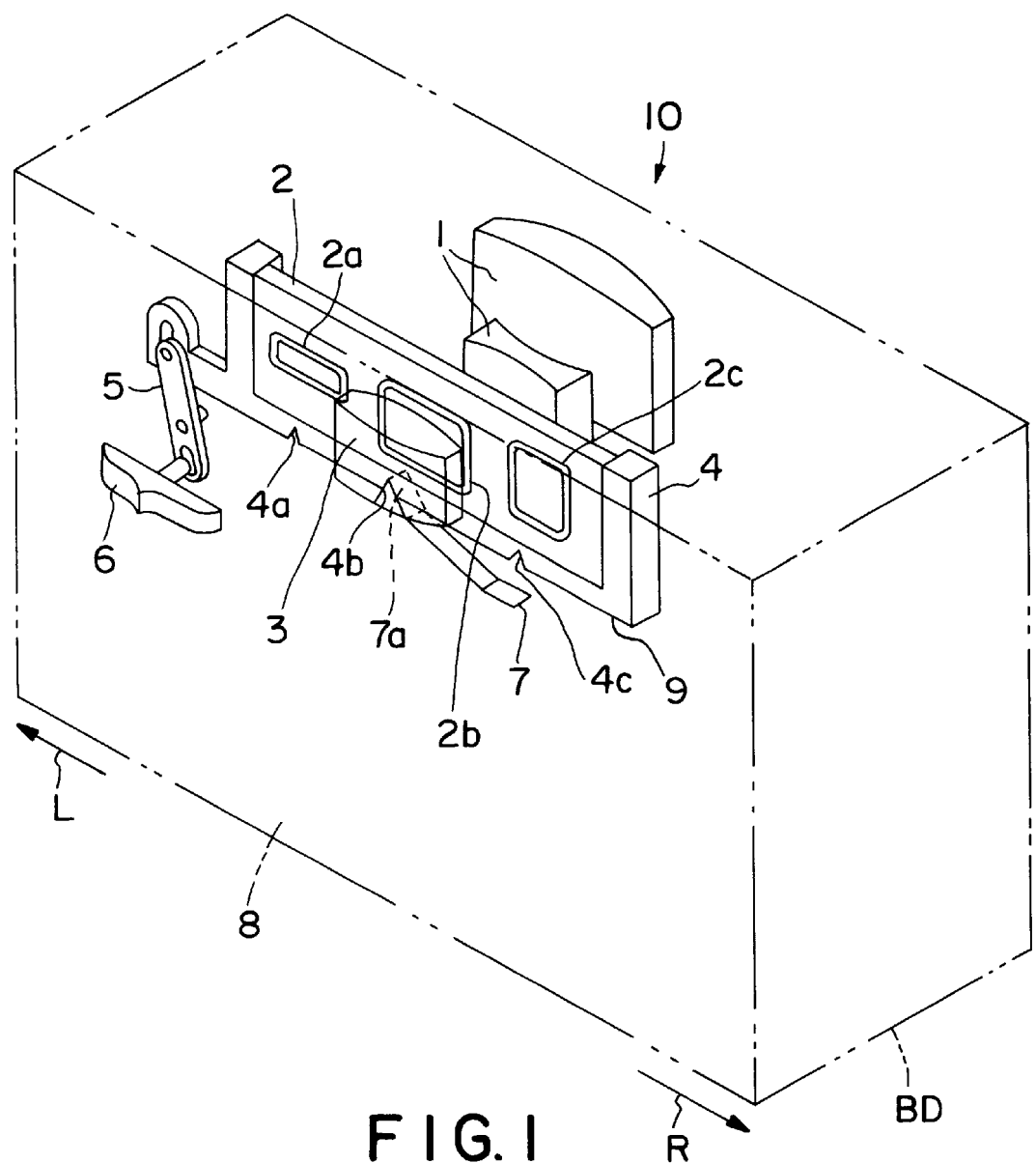
FIG. 1 is a perspective view illustrating a viewfinder device according to a preferred embodiment of the present invention.

Reference will now be made in detail to the preferred embodiments of the present invention, examples of which are illustrated in the accompanying drawings, wherein like reference numerals refer to like elements throughout.

Figure 2:
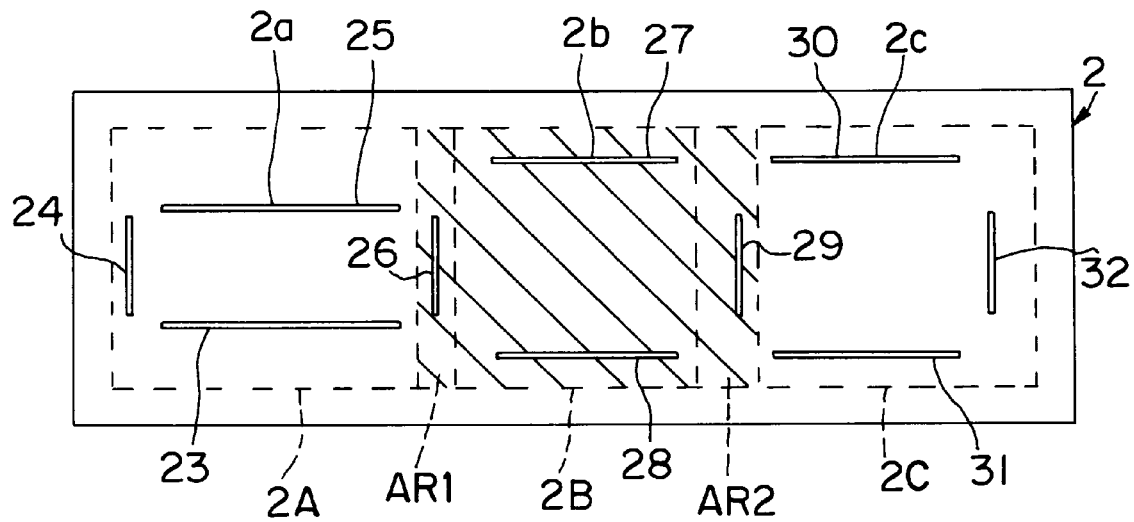
FIG. 2 is a front planar view of a viewfinder mask member for the viewfinder device of FIG. 1, illustrating selection of a visual field frame display unit.
Figure 3:
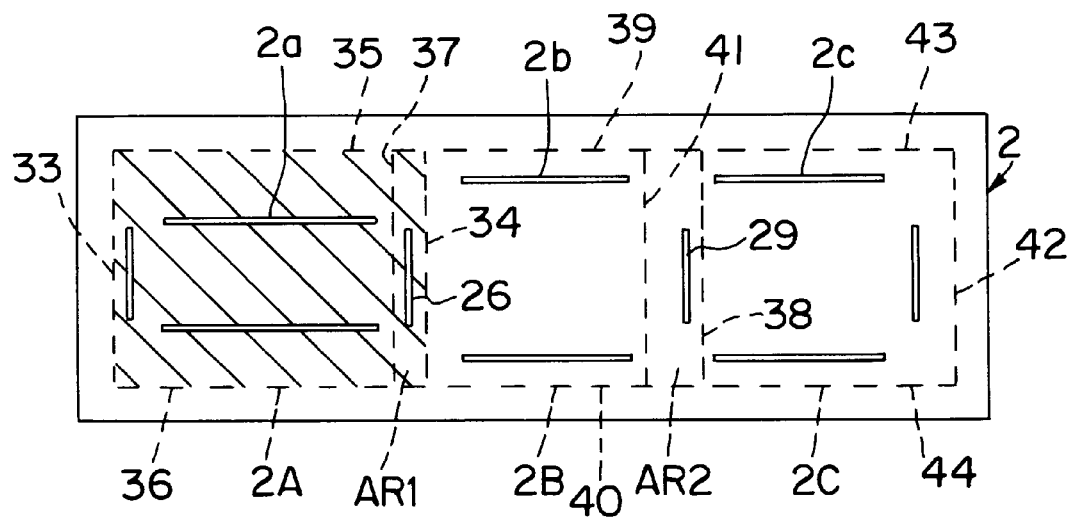
FIG. 3 is a front planar view of a viewfinder mask member, illustrating selection to a visual field frame display unit different from the visual field frame display unit selected in FIG. 2.

A camera viewfinder 10, such as an Albada viewfinder, according to a preferred embodiment of the present invention is illustrated in FIGS. 1–3. As illustrated in FIG. 1, viewfinder 10 includes an objective lens group 1 and an eyepiece lens 3, located in a camera body BD. The camera body BD has a front surface 8. A viewfinder mask member 2 is positioned between objective lens group 1 and eyepiece lens 3. As illustrated in FIG. 2, mask member 2 has three overlapping visual field frame display units 2A–2C. Three visual field frames 2a–2c are located in respective visual field frame display units 2A–2C.

As illustrated in FIG. 1, a mask holder 4 has a support unit (not shown) that supports viewfinder mask member 2. Mask holder 4 moves in a left horizontal direction L and a right horizontal direction R inside camera body BD. This movement in directions L and R is perpendicular to a viewfinder optical axis that extends from the camera body BD to a photographic subject. An end of mask holder 4 is coupled to a lever 5. Lever 5 is coupled to an actuating member 6 on front surface 8 of camera body BD. A sliding action of the actuating member 6 actuates lever 5.

When actuated by actuating member 6, lever 5 causes movement of mask holder 4 in directions L and R. As a result, mask holder 4 moves viewfinder mask member 2 in a camera horizontal direction defined by movement in directions L and R. A spring member 7 includes a coupling member 7a that makes contact with mask holder 4 along a lower side 9. V-grooves 4a–4c are formed in lower side 9 of mask holder 4 in positions corresponding respectively to visual field frames 2a–2c. By engaging engagement member 7a of spring member 7 in a respective V groove, visual field frame display units 2A–2C are each maintained and positioned in respective display positions. This display position corresponds with a viewfinder optical axis (not shown) that extends through mask member 2 to a photographic subject (not shown). The viewfinder optical axis also defines an optical path that extends through mask member 2 and the photographic subject. The viewfinder optical axis therefore becomes a central axis of one of visual field frame display units 2A–2C. As a result, one of visual field frames 2a–2c positioned in one of visual field frame display units 2A–2C that is positioned in the display position is positioned in the optical path and is displayed in an image plane of viewfinder 10.

FIG. 2 illustrates a state in which visual field frame display unit 2B of viewfinder mask member 2 has been positioned in the above-mentioned display position. FIG. 3 illustrates a state in which visual field frame display unit 2A has been positioned in the above-mentioned display position. Shaded portions of FIGS. 2 and 3 illustrate a visual field region which is visible through eyepiece lens 3. As illustrated in FIG. 2, visual field frames 2a–2c are formed by upper and lower, left and right boundary lines. For example, visual field frame 2a is formed by boundary lines 23 thru 26, visual field frame 2b is formed by boundary lines 26 thru 29, and visual field frame 2c is formed by boundary lines 29 thru 32. A portion shown as enclosed by each set of four (4) boundary lines 23–26, 26–29, or 29–32 defines a separate photographic range. As a result, boundary line 26 is an end portion shared by visual field frames 2a and 2b, corresponding to a right end portion of visual field frame 2a and a left end portion of visual field frame 2b. Similarly, boundary line 29 is an end portion shared by visual field frames 2b and 2c, corresponding to a right end portion of visual field frame 2b and a left end portion of visual field frame 2c.

As illustrated in FIG. 3, visual field frame display unit 2A is formed by a left boundary line 33, a right boundary line 34, an upper boundary line 35, and a lower boundary line 36. Visual field frame display unit 2B is formed by a left boundary line 37, a right boundary line 38, an upper boundary line 39, and a lower boundary line 40. Likewise, visual field frame display unit 2C is formed by a left boundary line 41, a right boundary line 42, an upper boundary line 43, and a lower boundary line 44.

As illustrated in FIGS. 2 and 3, right boundary line 34 of visual field frame display unit 2A extends beyond left boundary line 37 of visual field frame display unit 2B. A region AR1 is formed where visual field frame display units 2A and 2B overlap. Region AR1 is defined by boundary lines 34 and 37 and a portion where upper boundary line 35 and lower boundary line 36 of visual field frame display unit 2A overlap upper boundary line 39 and lower boundary line 40 of visual field frame display unit 2B. As a result, region AR1 forms a portion of the photographic range of both visual field frames 2a and 2b. Boundary line 26 extends in an up and down direction of the camera in region AR1.

Similarly, a region AR2 includes a portion of visual field frame display units 2B and 2C by being formed where visual field frame 2B and 2C overlap. Region AR2 is defined by boundary lines 38 and 41 and a portion where upper boundary line 39 and lower boundary line 40 of visual field frame display unit 2B overlap upper boundary line 43 and lower boundary line 44 of visual field frame display unit 2C. As a result, region AR2 forms a portion of the photographic range of both visual field frames 2b and 2c. Boundary line 29, extends in an up and down direction of the camera in region AR2 and forms the right boundary line of visual field frame 2b and the left boundary line of visual field frame 2c.

In a preferred embodiment of the present invention, because visual field frame display units 2A–2C overlap, a distance that viewfinder mask member 2 is required to move in order to position visual field frames 2a–2c in the optical path is reduced. In addition, a distance required to move viewfinder mask member 2 when changing between display positions of visual field frames 2a–2c is also reduced. As a result, physical dimensions of viewfinder device 10 are reduced, which in turn reduces the size of a camera.

Moreover, as illustrated in FIG. 2, boundary lines 24, 26, and 29 extend in an up and down direction and define left and right boundaries of photographic ranges corresponding to visual field frames 2a–2c. If a length of boundary lines 24, 26, and 29 is chosen to correspond to visual field frame 2b or 2c, when visual field frame 2a is selected by an operator during a photographing process, boundary lines 24 and 26 would extend beyond boundary lines 23 and 25. As a result, it would be difficult to form the photographic range corresponding to visual field frame 2a and visibility in visual field frame 2a would be corrupted.

As illustrated in FIG. 2, visual field frame 2a has a height extending from lower boundary line 23 to upper boundary line 25. Visual field frame 2b has a height extending from lower boundary line 28 to upper boundary line 27. Likewise, visual field frame 2c has a height extending from lower boundary line 31 to upper boundary line 30.

In a preferred embodiment of the present invention, a length of boundary lines 24, 26, and 29 is chosen to be equal to the left and right boundary of visual field frame 2a because a distance from boundary line 25 to boundary line 23 is less than a distance from boundary line 27 and 28 or boundary lines 30 and 31. More particularly, the length of boundary lines 24, 26, and 29 are chosen to be equal to the height of visual field frame 2a because the height of visual field frame 2a is less than the height of visual field frames 2b and 2c. As a result, when an operator selects any one of visual field frames 2a–2c during a photographic operation, boundary lines 24, 26, or 29 do not project upward beyond boundary lines 23, 25, 27, 28, 30, and 31 that extend horizontally. As a result, visibility in visual field frames 2a–2c is not corrupted.

Figure 4:
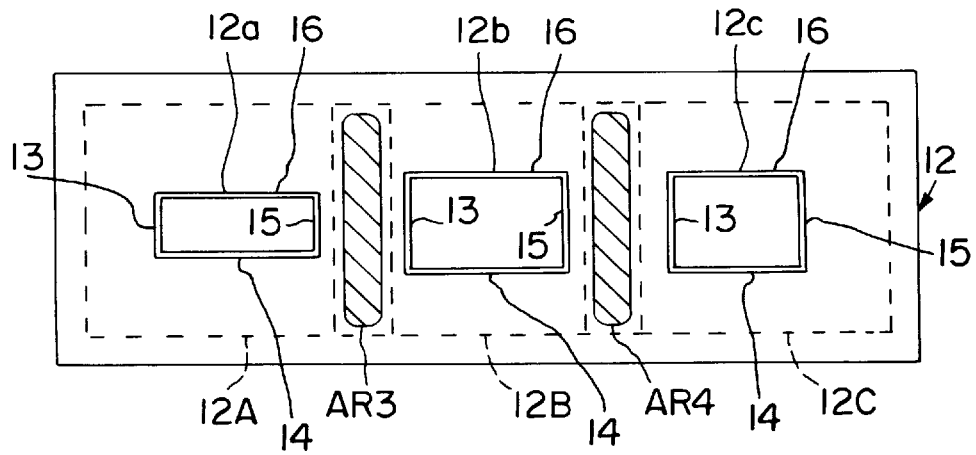
FIG. 4 is a front planar view illustrating a viewfinder mask member for a viewfinder device according to a preferred embodiment of the present invention.

FIG. 4 illustrates a viewfinder mask member 12 according to a preferred embodiment of the present invention. Viewfinder mask member 12 includes three visual field frames 12a–12c positioned within three corresponding visual field frame display units 12A–12C. A region AR3 and a region AR4, shown by shading, include overlapping portions of adjacent visual field frame display units 12A–12C. Region AR3 includes a right-hand portion of visual field frame display unit 12A that overlaps a left-hand portion of the visual field frame display unit 12B. Similarly, region AR4 includes a right-hand portion of visual field frame display unit 12B that overlaps a left-hand portion of visual field frame display unit 12C.

Because visual field frame display units 12A–12C overlap, a distance that viewfinder mask member 12 is required to move in order to position visual field frame display units 12a–12c is reduced. In addition, a distance required to move viewfinder mask member 2 when changing between display positions of visual field frames 12a–12c is also reduced. As a result, physical dimensions of viewfinder device 10 are reduced, which in turn reduces the size of a camera.

As illustrated in FIG. 4, visual field frames 12a and 12b are not included within region AR3. Likewise, visual field frames 12b and 12c are not included in region AR4. Visual field frame 12a is formed by four boundary lines 13–16. An area extending between boundary lines 13–16 define a photographic range of visual field frame 12a. Likewise, visual field frames 12b and 12c are formed by four boundary lines 13–16. An area extending between boundary lines 13–16 of each visual field frame 12b and 12c define a corresponding photographic range for each visual field frame 12b and 12c. Regions AR3 and AR4 are positioned outside photographic ranges of visual field frames 12a–12c.

Figure 5:
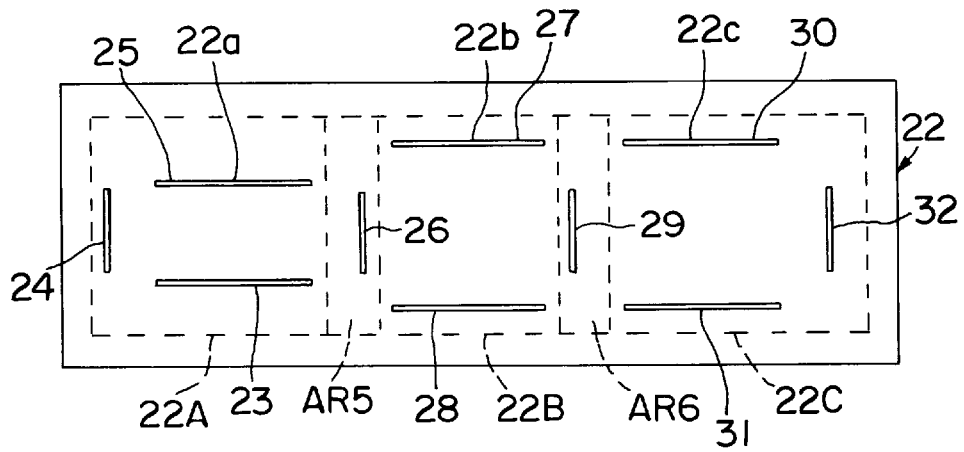
FIG. 5 is a front planar view illustrating a viewfinder mask member for a viewfinder device according to a preferred embodiment of the present invention.
Figure 6:
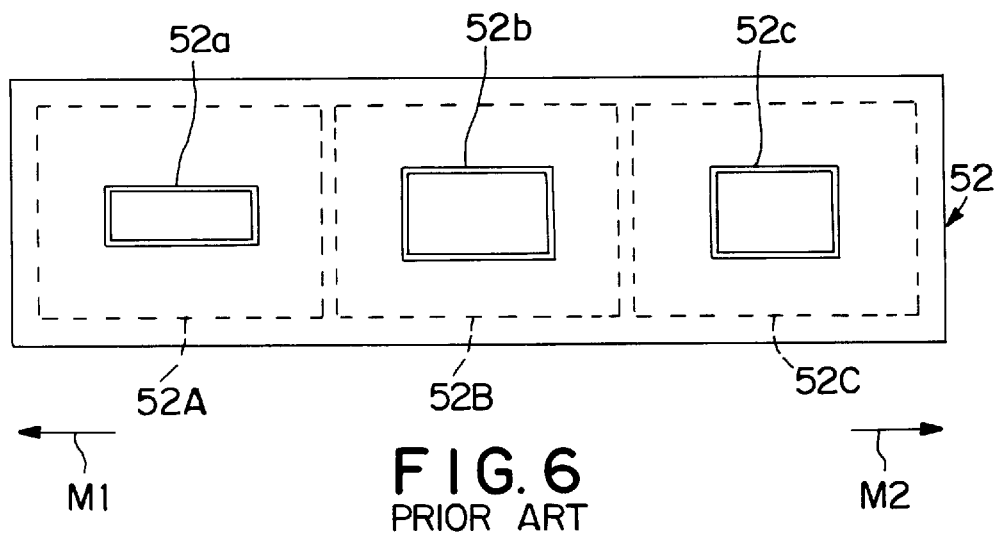
FIG. 6 (PRIOR ART) is a front planar view illustrating a prior art viewfinder mask member.

FIG. 5 illustrates a front view of a viewfinder mask member 22 for a viewfinder device according to a preferred embodiment of the present invention. Viewfinder mask member 22 includes visual field frames 22a–22c positioned within visual field frame display units 22A–22C. Visual field frames 22a–22c are formed by upper and lower. left and right boundary lines. For example, visual field frame 22a is formed by boundary lines 23–26. visual field frame 22b is formed by boundary lines 26–29, and visual field frame 22c is formed by boundary lines 29–32. A portion shown as enclosed by four boundary lines 23–26, 26–29, or 29–32 defines a photographic range corresponding to visual field frames 22a–22c. As a result, boundary line 26 is shared by visual field frames 22a and 22b, corresponding to a right boundary line of visual field frame 22a and a left boundary line of visual field frame 22b. Similarly, boundary line 29 is shared by visual field frames 22b and 22c, corresponding to a right boundary line of visual field frame 22b and a left boundary line of visual field frame 22c.

A distance between boundary line 24 and boundary line 26 defines a width of a first photographic range of visual field frame 22a. A distance between boundary line 29 and boundary line 32 defines a width of a third photographic range of visual field frame 22c. Likewise, a distance between boundary line 26 and boundary line 29 defines a second photographic range of visual field frame 22b. The width of the first photographic range is equal to the width of the third photographic range. The width of the second photographic range is less than the corresponding widths of the first and third photographic ranges.

In the same way, a distance between boundary lines 27 and 28 defines a height of the photographic range of visual field frame 22b. A distance between boundary lines 30 and 31 defines a height of visual field frame 22c. Likewise, a distance between boundary lines 23 and 25 defines a height of visual field frame 22a. The height of the second photographic range is equal to the height of the third photographic range. But the height of the first photographic range is less than the height of the second and third photographic ranges.

A region AR5 and a region AR6 include overlapping portions of adjacent visual field frame display units 22A–22C. Region AR5 includes a right-hand portion of visual field frame display unit 22A that overlaps a left-hand portion of the visual field frame display unit 22B. Similarly, region AR6 includes a right-hand portion of visual field frame display unit 22B that overlaps a left-hand portion of visual field frame display unit 22C. Boundary line 26 located in region AR5 constitutes a right-hand boundary line of visual field frame 22a and a left-hand boundary line of visual field frame 22c. Moreover, boundary line 29 located in region AR6 constitutes a right-hand boundary line of visual field frame 22c and a left-hand boundary line of visual field frame 22b.

Visual field frame 22b of viewfinder mask member 22, illustrated in FIG. 5, is centrally located. Since the width of the second photographic range corresponding to visual field frame 22b is less than the width of the first and third photographic ranges corresponding respectively to visual field frames 22a and 22c, the distance required to move viewfinder mask member 22 when changing between adjacent visual field frame display units 22A–22C is equal. As a result, the distance that actuating member 6, illustrated in FIG. 1, is required to be moved is the same no matter which visual field frame display unit 22A–22C is chosen by the operator. Accordingly, the operator is less likely to become confused when operating actuating member 6.

Although movement of the above described viewfinder mask member as illustrated is shown as being in the camera horizontal direction, movement of the viewfinder mask member may be in the up and down direction of the camera. In addition, although the number of visual field frame display units is shown to be three, there may be two or more visual field frame display units.

The present invention is described as relating to a camera. However, the present invention is not intended to be limited to a camera, but may be used in other devices including, but not limited to, binoculars, telescopes and microscopes, and the like.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A viewfinder device for viewing a photographic image along an optical path, comprising:

a first visual field frame display unit and a second visual field frame display unit;

a moveable viewfinder mask member to move the first and second visual field frame display units within the optical path; and a first visual field frame and a second visual field frame positioned within respective first and second visual field frame display units to define a photographic range, wherein the first and second visual field frame display units overlap.

2. A viewfinder device according to claim 1, further comprising an overlapping region where the first and second visual field frame display units overlap, wherein the overlapping region is within the photographic range.

3. A viewfinder device according to claim 2, further comprising an end portion having a length that corresponds to both the first and second visual field frames, wherein the end portion is positioned within the overlapping region.

4. A viewfinder device according to claim 3, further comprising a first visual field frame height corresponding to the first visual field frame, and a second visual field frame height corresponding to the second visual field frame.

5. A viewfinder device according to claim 4, wherein when the first visual field frame height is greater than or equal to the second visual field frame height, the length of the end portion is equal to the second visual field frame height.

6. A viewfinder device according to claim 4, wherein when the first visual field frame height is less than the second visual field frame height, the length of the end portion is equal to the first visual field frame height.

7. A viewfinder device according to claim 1, further comprising an overlapping region where the first and second visual field frame display units overlap, wherein the overlapping region is outside the photographic range.

8. A viewfinder device for viewing a photographic image along an optical path, comprising:
    a first visual field frame display unit and a second visual field frame display unit;
    an overlapping region where the first and second visual field frame display units overlap;
    a moveable display member to position the first and second visual field frame display units within the optical path;
    a first visual field frame and a second visual field frame positioned within respective first and second visual field frame display units to define corresponding first and second photographic ranges; and
    an end portion having a length that corresponds to both the first and second visual field frames, wherein the end portion is positioned within the overlapping region.

9. A viewfinder device according to claim 8, wherein when the first visual field frame display unit is positioned in the optical path, the overlapping region includes the first photographic range.

10. A viewfinder device according to claim 8, wherein when the second visual field frame display unit is positioned in the optical path, the overlapping region includes the second photographic range.

11. A viewfinder device according to claim 8, further comprising a first visual field frame height corresponding to the first visual field frame, and a second visual field frame height corresponding to the second visual field frame.

12. A viewfinder device according to claim 11, wherein when the first visual field frame height is greater than or equal to the second visual field frame height, the length of the end portion is equal to the second visual field height.

13. A viewfinder device according to claim 11, wherein when the first visual field frame height is less than the second visual field frame height, the length of the end portion is equal to the first visual field frame height.

14. A viewfinder device having an optical path for viewing a photographic image, comprising:
    a first, a second, and a third visual field frame display unit;
    a moveable display member to move the first, second, and third visual field frame display units within the optical path;
    a first, a second, and a third visual field frame having end portions, positioned within respective first, second, and third visual field frame display units;
    a first, a second and a third photographic range having widths and corresponding to respective first, second, and third visual field frames; and
    a first overlapping region where the first and second visual field frames overlap, and a second overlapping region where the second and third visual field frame display units overlap.

15. A viewfinder device according to claim 14, further comprising a first boundary line that corresponds to the end portion of both the first and second visual field frames, and a second boundary line that corresponds to the end portion of both the second and third visual field frames, wherein the first and second boundary lines are positioned within respective first and second overlapping regions.

16. A viewfinder device of claim 15, wherein the width of the first photographic range is greater than the width of the second photographic range.

17. A viewfinder device according to claim 16, wherein the width of the first photographic range is equal to the width of the third photographic range.

18. A viewfinder device according to claim 17, further comprising a second and a third height corresponding respectively to the second and third photographic ranges, wherein the second height is equal to the third height.

19. A viewfinder according to claim 18, further comprising a first height corresponding to the first photographic range, wherein the second height is greater than the first height.

* * * * *